March 12, 1946.  G. L. MILLER  2,396,334
FOOD JAR EXTRACTOR TOOL FOR PRESSURE COOKERS
Filed March 8, 1945  2 Sheets-Sheet 1
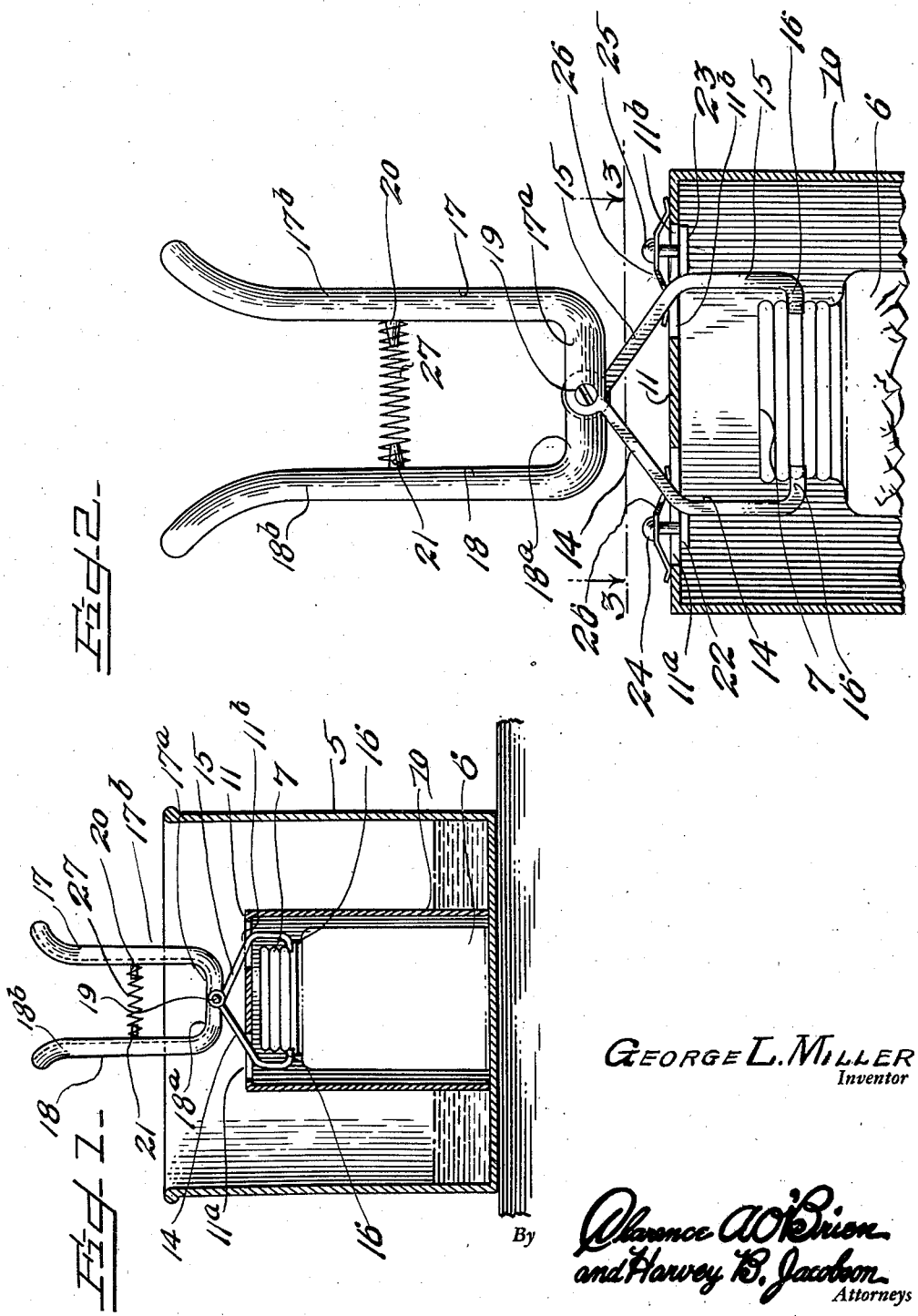
George L. Miller
Inventor
By Clarence A. O'Brien
and Harvey B. Jacobson
Attorneys March 12, 1946.  G. L. MILLER  2,396,334
FOOD JAR EXTRACTOR TOOL FOR PRESSURE COOKERS
Filed March 8, 1945   2 Sheets-Sheet 2
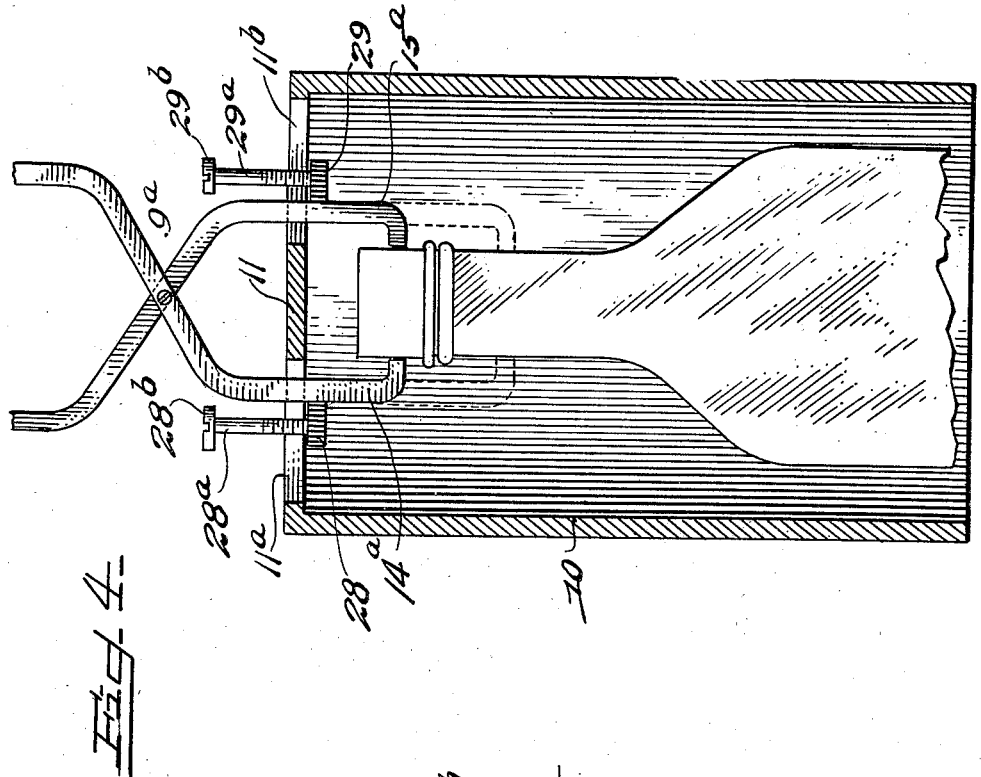
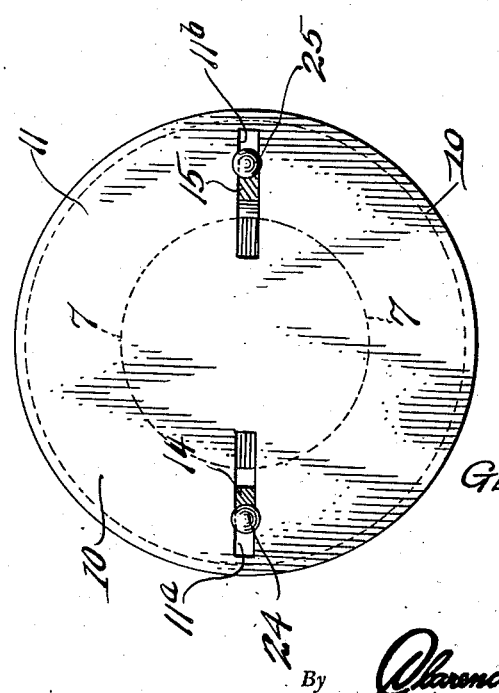
George L. Miller
Inventor Patented Mar. 12, 1946

2,396,334

UNITED STATES PATENT OFFICE 2,396,334

FOOD JAR EXTRACTOR TOOL FOR PRESSURE COOKERS

George L. Miller, Graham, Tex.

Application March 8, 1945, Serial No. 581,614

5 Claims. (Cl. 294—28)

This invention relates to a tool for extracting or removing food jars from pressure cookers, while they are hot, and one of its objects is to provide a tool with means for gripping the closure of the jar or other container, and additional means for protecting the housewife or other person engaging in removing the vessels of cooked food, from the effects of the explosion of the jar, or its breakage for any reason, and to protect the glass container against chilling drafts while it is being removed, so that the danger of breakage of the container will be largely eliminated.

Another object of the invention is to combine the tool with the protector device, or cylinder, in such manner that the protecting device may be placed over and around the food container to be removed, and the tool then operated to grip the closure or neck of the container to permit of the safe withdrawal of the food container from the pressure cooker.

With the above and other objects in view, the invention consists in certain new and useful combinations, constructions and arrangements of parts, clearly illustrated in the following specification, and fully illustrated in the accompanying drawings, in which:

Fig. 1 is a vertical sectional view through a pressure cooker, also showing the protecting cylinder in section.

Fig. 2 is an enlarged fragmentary vertical sectional view through the protecting cylinder, showing the gripping tool in elevation.

Fig. 3 is a horizontal sectional view, taken on line 3—3 of Fig. 2, looking in the direction of the arrows.

Fig. 4 is a vertical sectional view through the protecting cylinder, showing the extracting or handling tool applied to a small neck container, and also showing a modified connection between the tool and the protecting cylinder.

Referring to the accompanying drawings, which illustrate the practical application of my invention, 5 designates a pressure cooker vessel, the usual top or cover of which is not shown. In this vessel one or more food containers 6 are arranged in the usual manner, and each food container, usually a glass jar, is equipped with the usual screw cap or closure 7, which is loosely coupled in place, so that any air contained in the vessel may be expelled in the pressure cooking process.

When the cooking time limit has arrived the cover or top of the pressure cooker is removed in the usual manner, and the food containers are withdrawn. In this operation of withdrawing the food containers from the pressure cooker, the glass vessels are frequently exposed to drafts which chill portions of the wall of the glass vessels, which often crack, causing the pressure of the hot fluids and foods of the container to explode the vessels and scatter the contents upon the person of the operator and about the kitchen or room in which the cooking is being done.

In order to protect the glass against being chilled when the food containers are withdrawn from the pressure cooker, I provide a cylinder 10, which is open at its lower end, and provided with a top 11, permanently united thereto. This cylinder is large enough to enclose a standard food preserving jar, and high enough to bring the top 11 above the lever of the closure 7 of the container or jar 6.

The cylinder top 11 is formed with two slots 11a and 11b, which are located on opposite sides of the center of the top, and in longitudinal alignment with each other. The gripping jaws 14 and 15 of the handling tool 16 are inserted in the cylinder through the slots 11a and 11b of the top 11. Each jaw is provided with an L-shaped inner end 16, adapted to grip the screw threaded closure 12 of the food container 13.

The jaw 14 is integral with the L-shaped handle 17, and the jaw 15 is integral with the L-shaped handle 18, and these two handles are pivotally connected to each other by the screw or rivet 19, which extends through the inner short arms 17a and 18a of the handles 17 and 18, which are shown to be disposed at approximately right angles to the long arms 17b and 18b of the handles. The long arms 17b and 18b are engaged by the compression coil spring 19', which is held in place at its ends by the pins 20 and 21, secured to the long hand arms 17b and 18b, and are normally in approximate parallel positions to each other. The jaws 14 and 15 extend diagonally from the right angular short arms 17a and 18a of the handles.

When the closure of the food container is gripped between the jaws 14 and 15, and the container is lifted through the handling tool 9, the closure of the food container or jar will be moved against the inner face of the top 11, and the cylinder 10 will be withdrawn with the container from the pressure cooker.

The handling tool may be positively connected with the safety cylinder 10, as shown in Figs. 2 and 3. Referring to these figures the handling tool 9 is shown to be provided with lugs 22 and 23, which are integral with the jaws 14 and 15. The jaw lug 22 is slidably connected by the rivet 24, through the slot 11a, and the jaw lug 23 is slidably connected by the rivet 25, through the slot 11b, with the top 11. A spring washer 26 is placed between the head of each rivet and the top 11. A compression spring 27 is arranged between the handles 17 and 18.

In this construction the handling tool is permanently connected to the safety cylinder, and when the handles of the tool are pressed together to grip the closure of the food container, the lugs 22 and 23 will slide on the top 11, the spring washers permitting of the swinging movement of the jaws 14 and 15.

In Fig. 4 I show another modified form of the connection of the handling tool with the safety cylinder. In this view the handling tool 9a is shown to be formed with jaws 14a and 15a, which are approximately parallel to each other for a considerable distance, and which are formed with integral and external lugs 28 and 29. To the lug 28 the inner end of the screw 28a is threaded, and this screw is provided with a head 28b on its outer end, which is shown to be spaced a considerable distance above the top 11 of the cylinder 10, the screw extending through the slot 11a of the container top 11. The inner end of the screw 29a is connected with the lug 29, and this screw is provided with a head 29b on its outer end. The screw 29a extends through the slot 11b of the top 11.

This connection between the handling tool 9a and the slotted cylinder, permits of a relatively wide variation in the position of the handling tool in the safety cylinder, and by adjusting the screws 28a and 29a on the lugs 28 and 29 this variation may be decreased or increased. When the container is grasped the closure of the container will engage the top of the cylinder and the two can be withdrawn at one time from the pressure cooker. This sliding connection is adapted to permit of the use of one size of safety cylinder for food containers of varying depths, or for long necked bottles, as indicated in Fig. 4.

The gripping end of each jaw is preferably formed concave, so as to have a relatively wide matching contact with the cylindrical surface of the food container closure it engages. This also tends to prevent displacement of the container from the handling tool.

It is understood that various changes in the details of construction, their combination, proportion and arrangement, may be resorted to, within the scope of the invention, as defined by the claims hereof.

Having described my invention, I claim as new:

1. In combination, a safety cylinder adapted to enclose a food container, said cylinder having a top formed with aligned slots, and a handling tool having jaws extended through the slots to grip the upper end of a food container enclosed by the cylinder.

2. In combination, a safety cylinder having a top formed with slots, and a two jaw container gripping tool extended through the slots and provided with handles for closing the jaws upon a food container enclosed by the cylinder.

3. Means for removing food preserving jars from pressure cookers and the like, consisting of a cylinder adapted to completely enclose the sides and top of the jar to be removed, said cylinder having a top provided with slots, and a handling tool consisting of a pair of handles pivotally connected to each other, each handle having an L-shaped jar gripping jaw, the jaws of the handling tool being extended through the slots and being adapted to grip a jar disposed within the cylinder, whereby the cylinder will protect the jar against being suddenly chilled and cracked and the person handling the jar will be protected against the effects of jar explosions.

4. Means for removing food preserving jars from cookers, consisting of a cylinder having a top provided with slots, a handling tool formed with L-shaped jaws extended through said slots and provided with handles extending above the cylinder, each of said jaws being provided with a lateral lug, and means slidably connecting the lugs to the slotted top of the cylinder.

5. The combination set forth in claim 4, the last-named means consisting of screws adjustable on said lugs and extending through the slots of the cylinder top, each of said screw being provided with a head on its upper end.

GEORGE L. MILLER.